United States Patent
Chang et al.

(10) Patent No.: US 9,382,369 B2
(45) Date of Patent: Jul. 5, 2016

(54) RUBBER-MODIFIED VINYL-BASED GRAFT COPOLYMER, AND THERMOPLASTIC RESIN COMPOSITION INCLUDING THE SAME

(71) Applicant: Cheil Industries Inc., Gumi-si (KR)

(72) Inventors: Ki Bo Chang, Uiwang-si (KR); Jun Hwan Ahn, Uiwang-si (KR); Sung Il Myung, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 284 days.

(21) Appl. No.: 13/927,219

(22) Filed: Jun. 26, 2013

(65) Prior Publication Data

US 2013/0289198 A1 Oct. 31, 2013

Related U.S. Application Data

(63) Continuation-in-part of application No. PCT/KR2011/008953, filed on Nov. 23, 2011.

(30) Foreign Application Priority Data

Dec. 30, 2010 (KR) .................... 10-2010-0138838

(51) Int. Cl.
  *C08F 293/00* (2006.01)
  *C08L 69/00* (2006.01)
  *C08L 51/04* (2006.01)
  *C08F 279/02* (2006.01)
  *C08F 285/00* (2006.01)

(52) U.S. Cl.
  CPC ............. *C08F 293/00* (2013.01); *C08F 279/02* (2013.01); *C08F 285/00* (2013.01); *C08L 69/00* (2013.01); *C08L 51/04* (2013.01)

(58) Field of Classification Search
  CPC ........ C08F 293/00; C08L 69/00; C08L 51/04
  See application file for complete search history.

(56) References Cited

U.S. PATENT DOCUMENTS

| | | | | |
|---|---|---|---|---|
| 5,409,967 A * | 4/1995 | Carson | .................. | C08F 257/02 523/201 |
| 5,574,100 A * | 11/1996 | Sagane | ................ | C08F 285/00 508/468 |
| 5,859,144 A * | 1/1999 | Saito et al. | ................. | 525/326.2 |
| 6,403,683 B1 | 6/2002 | Kobayashi | | |
| 6,635,727 B1 * | 10/2003 | Koda | .................... | C08F 210/18 521/140 |
| 2004/0116583 A1 | 6/2004 | Okada et al. | | |
| 2005/0228131 A1 * | 10/2005 | Jang et al. | ........................ | 525/68 |
| 2007/0287799 A1 * | 12/2007 | Ha et al. | ........................... | 525/71 |
| 2008/0161494 A1 * | 7/2008 | Lee et al. | ......................... | 525/66 |

FOREIGN PATENT DOCUMENTS

| | | |
|---|---|---|
| EP | 1375586 A1 | 1/2004 |
| KR | 10-0848176 B1 | 7/2008 |
| WO | 2012/091295 A1 | 7/2012 |

OTHER PUBLICATIONS

Machine translation of KR 10-0848176 (2015).*
The Scifinder summary of U.S. Pat. No. 5,859,144 dated 1997.*
International Search Report in counterpart International Application No. PCT/KR2011/008953 dated May 21, 2012, pp. 1-4.

* cited by examiner

*Primary Examiner* — Mark Kaucher
(74) *Attorney, Agent, or Firm* — Additon, Higgins & Pendleton, P.A.

(57) ABSTRACT

The present invention relates to a rubber-modified vinyl-based graft copolymer to which acrylic monomers containing a phenyl or phenoxy group are grafted in order to increase compatibility with a polycarbonate resin, and also relates to a thermoplastic resin composition including the rubber-modified vinyl-based graft copolymer. The thermoplastic resin composition according to the present invention can significantly improve appearance and high fluidity and can have high flowability and chemical resistance.

10 Claims, No Drawings

RUBBER-MODIFIED VINYL-BASED GRAFT COPOLYMER, AND THERMOPLASTIC RESIN COMPOSITION INCLUDING THE SAME

CROSS-REFERENCE TO RELATED APPLICATIONS

This application is a continuation-in-part of International Application No. PCT/KR2011/008953, filed, Nov. 23, 2011, pending, which designates the U.S., published as WO 2012/091295, and is incorporated herein by reference in its entirety, and claims priority therefrom under 35 USC Section 120. This application also claims priority under 35 USC Section 119 to and the benefit of Korean Patent Application No. 10-2010-0138838, filed Dec. 30, 2010, the entire disclosure of which is incorporated herein by reference.

FIELD OF THE INVENTION

The present invention relates to a rubber-modified vinyl-based graft copolymer that can have improved compatibility with a polycarbonate resin, and a thermoplastic resin composition including the same.

BACKGROUND OF THE INVENTION

Polycarbonate (PC)/acrylonitrile-butadiene-styrene (ABS) alloy resins can have heat resistance and impact strength of a polycarbonate resin (PC) and processability and chemical resistance of an acrylonitrile-butadiene-styrene (ABS), thereby providing excellent processability and mechanical properties. Accordingly, the PC/ABS alloy resins may be utilized in various applications including not only electric and electronic products, such as monitor housings, hard disks, printers, notebook batteries, and the like, but also automobile components, such as door handles, bumpers, instrument panels, and the like.

When PC and ABS resins are kneaded or mixed when preparing a PC/ABS alloy resin, ABS is present in the form of a rubber incorporated into a styrene-acrylonitrile (SAN) domain. The alloy resin can undergo deterioration in gloss or appearance according to the domain size, and deterioration in thermal properties according to the amount of ABS.

To address this problem, methods for dispersing ABS using grafted ABS having high rubber content upon kneading ABS with PC have been suggested. However, despite improvement in dispersibility of ABS in PC, such methods have a problem of local deformation of appearance caused by modification of rubber in ABS, dispersion of ABS resin around a site, such as a gate, in which a huge difference in fluidity occurs during injection molding, and the like.

Non-halogen-based flame retardant PC/ABS resins are often used as exterior materials for large flat televisions, which require high coloring and high gloss appearance. Deterioration in appearance of such products made of flame retardant PC/ABS resins can cause variation in surface roughness due to GAS materials, problems in dispersion of ABS resin, and modification of rubber in ABS resin.

Despite compatibility between PC and ABS, PC and ABS are present in two phases, in which the ABS phase mainly constitutes domains. The size of domains and the degree of dispersibility of the domains may vary depending on injection molding conditions. Non-uniform dispersibility of PC and ABS results in non-uniform index of refraction of PC and ABS, causing some phenomena, such as sagging mark and/or smearing of ABS or PC, on surfaces of molded articles.

In order to address such deterioration in appearance, PC can be mixed with ABS having a low content of rubber. In this case, the amount of ABS can be increased to maintain an appropriate rubber content, and the size of the ABS resin domain also increases due to increase of SAN content in ABS. In this case, the domain can be decreased by changing extrusion/injection molding conditions. In addition, the ABS resin having a high content of rubber (grafted ABS resin) can be mixed with PC in order to inhibit the formation of SAN domains as much as possible. Namely, SAN is graft polymerized to interfaces of rubber particles. When the ABS resin having a high content of rubber is mixed with PC, the ABS resin can have improved dispersibility. However, the ABS resin can be partially present in an aciniform shape according to molding conditions, size and content of rubber in the ABS resin, and the SAN component ratio and structure in a grafted layer, thereby deteriorating the quality of the grafted resin.

SUMMARY OF THE INVENTION

The present invention provides a rubber-modified vinyl-based graft copolymer that includes an aromatic (meth)acrylate monomer grafted to a surface thereof to enhance compatibility with polycarbonate and maximize dispersibility in a resin substrate.

The present invention also provides a thermoplastic resin composition that includes the rubber-modified vinyl-based graft copolymer and a polycarbonate resin, which composition can have significantly improved appearance, fluidity and impact resistance.

The present invention further provides a method for preparing a rubber-modified vinyl-based graft copolymer that includes an aromatic (meth)acrylate monomer grafted to a surface thereof.

The present invention further provides a molded article produced by molding the thermoplastic resin composition.

The present invention relates to a rubber-modified vinyl-based graft copolymer to which an aromatic (meth)acrylate monomer is grafted.

In the present invention, the rubber-modified vinyl-based graft copolymer may have an aromatic (meth)acrylate grafted to a surface thereof.

In addition, the rubber-modified vinyl-based graft copolymer may have a core-shell structure, and the aromatic (meth) acrylate may be contained in a shell component.

In the present invention, the aromatic (meth)acrylate may be represented by Formula 1:

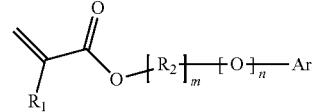

[Formula 1]

wherein $R_1$ is hydrogen or methyl, $R_2$ is substituted or unsubstituted $C_1$ to $C_{10}$ alkylene, Ar is substituted or unsubstituted phenyl, m is 0 or 1, and n is 0 or 1. Examples of the aromatic (meth)acrylate may include without limitation 2-hydroxy-3-phenoxy propyl acrylate, 2-hydroxy-3-phenoxy propyl methacrylate, phenoxy ethyl acrylate, phenoxy ethyl methacrylate, phenyl methacrylate, phenyl acrylate, and the like and combinations thereof.

In the present invention, the rubber-modified vinyl-based graft copolymer may include about 40 wt % to about 70 wt % of a rubber polymer and about 30 wt % to about 60 wt % of a monomer mixture including an aromatic (meth)acrylate.

The monomer mixture may include about 50 wt % to about 95 wt % of a vinyl-based monomer and about 5 wt % to about 50 wt % of the aromatic (meth)acrylate.

The vinyl-based monomer may include about 70 wt % to about 80 wt % of an aromatic vinyl-based monomer and about 20 wt % to about 30 wt % of a vinyl cyanide monomer. Examples of the aromatic vinyl-based monomer may include without limitation styrene, p-t-butylstyrene, alpha-methylstyrene, beta-methylstyrene, vinyl xylene, monochlorostyrene, dichlorostyrene, dibromostyrene, chlorostyrene, ethylstyrene, and the like, and mixtures thereof. Examples of the vinyl cyanide monomer may include without limitation acrylonitrile, methacrylonitrile, ethacrylonitrile, and the like, and mixtures thereof.

The present invention also relates to a thermoplastic resin composition including the rubber-modified vinyl-based graft copolymer.

In the present invention, the thermoplastic resin composition may include about 70 wt % to about 99 wt % of a polycarbonate resin and about 1 wt % to about 30 wt % of the rubber-modified vinyl-based graft copolymer, based on the total weight of the thermoplastic resin composition.

A further embodiment of the present invention relates to a method for preparing a rubber-modified graft copolymer, which includes: adding a vinyl-based monomer to a rubber polymer to perform a first polymerization; and adding a vinyl-based monomer and an aromatic (meth)acrylate monomer to the first polymerized polymer to perform a second polymerization.

In the preparation method of the invention, the first polymerization may be carried out by swelling polymerization. The vinyl-based monomer may include about 70 wt % to about 80 wt % of an aromatic vinyl-based monomer and about 20 wt % to about 30 wt % of a vinyl cyanide monomer.

Further, upon first polymerization, the vinyl-based monomer may be added such that the amount of vinyl-based monomer is about 20 wt % to about 50 wt % relative to the total monomer mixture.

The present invention also relates to a molded article produced by molding the thermoplastic resin composition.

The thermoplastic resin composition including the rubber-modified vinyl-based graft copolymer of the present invention may not suffer from sagging marks and/or smearing on a surface of a molded article due to maximized dispersibility of the rubber-modified vinyl-based graft copolymer with a polycarbonate resin, and can have high gloss to provide significantly improved outer appearance, and high fluidity and impact resistance. Accordingly, the resin composition can be employed in the preparation of various electric and electronic products and automobile components requiring improved appearance, fluidity and impact resistance.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

According to the present invention, a rubber-modified vinyl-based graft copolymer includes an aromatic (meth) acrylate monomer grafted thereto. Herein, the term "(meth) acrylate" refers to both methacrylate and acrylate.

In addition, a thermoplastic resin composition according to the present invention includes the rubber-modified vinyl-based graft copolymer and a polycarbonate resin.

Hereinafter, the present invention will be described in more detail.

Rubber-Modified Vinyl-Based Graft Copolymer

The rubber-modified vinyl-based graft copolymer forms a dispersed phase in a resin substrate and acts as an impact reinforcing material. The rubber-modified vinyl-based graft copolymer includes an aromatic (meth)acrylate monomer grafted thereto. The aromatic (meth)acrylate monomer may be grafted to a surface of the rubber-modified vinyl-based graft copolymer. The rubber-modified vinyl-based graft copolymer may have a core-shell structure, and the aromatic (meth)acrylate may be included in a shell component.

The aromatic (meth)acrylate monomer can exhibit excellent compatibility with a base resin, such as a polycarbonate resin, and upon mixing the rubber-modified vinyl-based graft copolymer with the polycarbonate resin, the rubber-modified vinyl-based graft copolymer can exhibit maximized dispersibility in the resin substrate to minimize smearing or phase boundary on the resin surface, thereby improving outer appearance of a molded article.

The rubber-modified vinyl-based graft copolymer may be prepared by copolymerizing a monomer mixture including a vinyl-based monomer and an aromatic (meth)acrylate monomer with a rubber polymer.

The rubber-modified vinyl-based graft copolymer may include the rubber polymer in an amount of about 40 wt % to about 70 wt %, for example, about 45 wt % to about 60 wt %, based on the total weight of the rubber-modified vinyl-based graft copolymer. In some embodiments, the rubber-modified vinyl-based graft copolymer may include the rubber polymer in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, the amount of the rubber polymer can be in a range from about any of the foregoing amounts to about any other of the foregoing amounts.

The rubber-modified vinyl-based graft copolymer may include the monomer mixture in an amount of about 30 wt % to about 60 wt %, for example about 40 wt % to about 55 wt %, based on the total weight of the rubber-modified vinyl-based graft copolymer. In some embodiments, the rubber-modified vinyl-based graft copolymer may include the monomer mixture in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt %. Further, according to some embodiments of the present invention, the amount of the monomer mixture can be in a range from about any of the foregoing amounts to about any other of the foregoing amounts.

When the rubber-modified vinyl-based graft copolymer includes the rubber polymer and/or monomer mixture in an amount within these ranges, the graft copolymer can provide appropriate impact strength, fluidity and appearance to finished products.

Examples of the rubber polymer may include without limitation butadiene rubber, acrylic rubber, ethylene/propylene rubber, styrene/butadiene rubber, acrylonitrile/butadiene rubber, isoprene rubber, ethylene-propylene-diene terpolymer (EPDM), polyorganosiloxane/polyalkyl methacrylate rubber complex, and the like, and mixtures thereof. To improve impact strength and appearance of finished products, the rubber polymer can have an average particle size of about 0.1 μm to about 0.5 μm, for example about 0.2 μm to about 0.4 μm.

The monomer mixture may include a vinyl-based monomer and the aromatic (meth)acrylate monomer.

The vinyl-based monomer may include an aromatic vinyl-based monomer and a vinyl cyanide monomer.

The vinyl-based monomer may include the aromatic vinyl-based monomer in an amount of about 70 wt % to about 80 wt %, based on the total weight of the vinyl-based monomer. In some embodiments, the vinyl-based monomer may include the aromatic vinyl-based monomer in an amount of about 70, 71, 72, 73, 74, 75, 76, 77, 78, 79, or 80 wt %. Further, according to some embodiments of the present invention, the amount of the aromatic vinyl-based monomer can be in a range from about any of the foregoing amounts to about any other of the foregoing amounts.

The vinyl-based monomer may include the vinyl cyanide monomer in an amount of about 20 wt % to about 30 wt %, based on the total weight of the vinyl-based monomer. In some embodiments, the vinyl-based monomer may include the vinyl cyanide monomer in an amount of about 20, 21, 22, 23, 24, 25, 26, 27, 28, 29, or 30 wt %. Further, according to some embodiments of the present invention, the amount of the vinyl cyanide monomer can be in a range from about any of the foregoing amounts to about any other of the foregoing amounts.

Examples of the aromatic vinyl-based monomer may include without limitation styrene, p-t-butylstyrene, alpha-methylstyrene, beta-methylstyrene, vinyl xylene, monochlorostyrene, dichlorostyrene, dibromostyrene, chlorostyrene, ethylstyrene, and the like, and mixtures thereof.

Examples of the vinyl cyanide monomer may include without limitation acrylonitrile, methacrylonitrile, ethacrylonitrile, and the like, and mixtures thereof.

As the aromatic (meth)acrylate monomer, a phenyl and/or phenoxy group-containing (meth)acrylate may be advantageously used. In one embodiment, the aromatic (meth)acrylate monomer may be represented by Formula 1:

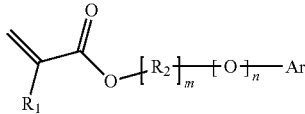

[Formula 1]

wherein $R_1$ is hydrogen or methyl, $R_2$ is substituted or unsubstituted $C_1$ to $C_{10}$ alkylene, Ar is substituted or unsubstituted phenyl, m is 0 or 1, and n is 0 or 1.

The term "substituted" used herein means that at least one hydrogen atom is a substituted with halogen, a hydroxyl group, a nitro group, a cyano group, an amino group, an azido group, an amidino group, a hydrazino group, a carbonyl group, a carbamyl group, a thiol group, an ester group, a carboxyl group or a salt thereof, a sulfonic acid group or a salt thereof, a phosphate group or a salt thereof, a $C_1$-$C_{20}$ alkyl group, a $C_2$-$C_{20}$ alkenyl group, a $C_2$-$C_{20}$ alkynyl group, a $C_1$-$C_{20}$ alkoxy group, a $C_6$-$C_{30}$ aryl group, a $C_6$-$C_{30}$ aryloxy group, a $C_3$-$C_{30}$ cycloalkyl group, a $C_3$-$C_{30}$ cycloalkenyl group, a $C_3$-$C_{30}$ cycloalkynyl group, or a combination thereof.

The phenyl and/or phenoxy group-containing (meth)acrylate may include a hydroxyl group in its structure. In such case, the composition can exhibit excellent impact strength and fluidity.

Examples of the phenyl and/or phenoxy group-containing (meth)acrylate may include without limitation 2-hydroxy-3-phenoxy propyl acrylate, 2-hydroxy-3-phenoxy propyl methacrylate, phenoxy ethyl acrylate, phenoxy ethyl methacrylate, phenyl methacrylate, phenyl acrylate, and the like. These may be used alone or in combination of two or more thereof.

The monomer mixture may include about 50 wt % to about 95 wt % of the vinyl-based monomer, for example about 85 wt % to about 95 wt % of the vinyl-based monomer, based on the total weight of the monomer mixture. In some embodiments, the monomer mixture may include the vinyl-based monomer in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the vinyl-based monomer can be in a range from about any of the foregoing amounts to about any other of the foregoing amounts.

The monomer mixture may include about 5 wt % to about 50 wt % of the aromatic (meth)acrylate, for example about 5 wt % to about 15 wt % of the aromatic (meth)acrylate, based on the total weight of the monomer mixture. In some embodiments, the monomer mixture may include the aromatic (meth)acrylate in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the aromatic (meth)acrylate can be in a range from about any of the foregoing amounts to about any other of the foregoing amounts.

When the monomer mixture includes the vinyl-based monomer and the aromatic (meth)acrylate in an amount within the above ranges, the composition can ensure appropriate impact strength, fluidity and excellent appearance, and can reduce the number of weld lines and facilitate exhibition of chromatic colors.

In one embodiment, the rubber-modified vinyl-based graft copolymer may be prepared by graft copolymerizing a mixture of a styrene monomer, acrylonitrile, and an aromatic (meth)acrylate monomer with a butadiene rubber, an acrylic rubber, or a styrene/butadiene rubber. In exemplary embodiments, the rubber-modified vinyl-based graft copolymer is an ABS (acrylonitrile-butadiene-styrene) graft copolymer which includes an aromatic (meth)acrylate monomer grafted to a surface thereof.

The rubber-modified vinyl-based graft copolymer may have a core-shell structure, and the aromatic (meth)acrylate may be included in a shell component. The core component is comprised of a rubber polymer and a vinyl-based monomer, and the shell component is comprised of a vinyl-based monomer and an aromatic (meth)acrylate.

Further, the core component is present in an amount of about 50 wt % to about 85 wt %, for example about 60 wt % to about 75 wt %, and the shell component is present in an amount of about 15 wt % to about 50 wt %, for example about 25 wt % to about 40 wt %, based on the total weight of the copolymer.

In some embodiments, the copolymer may include the core component in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85 wt %. Further, according to some embodiments of the present invention, the amount of the core component can be in a range from about any of the foregoing amounts to about any other of the foregoing amounts.

In some embodiments, the copolymer may include the shell component in an amount of about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the shell component can be in a range from about any of the foregoing amounts to about any other of the foregoing amounts.

When the copolymer includes the core and shell components in amounts within these ranges, the graft copolymer can improve outer appearance of a finished product.

Methods for preparing the rubber-modified vinyl-based graft copolymer may include emulsion polymerization, suspension polymerization, solution polymerization, bulk polymerization, and the like. In exemplary embodiments, the rubber-modified vinyl-based graft copolymer can be prepared by adding the vinyl-based monomer and the aromatic (meth)acrylate monomer in the presence of a rubber polymer, followed by swelling and emulsion polymerization using a polymerization initiator.

In one embodiment, the method for preparing the rubber-modified vinyl-based graft copolymer may include: mixing a rubber polymer with a vinyl-based monomer to perform a first polymerization; and adding a vinyl-based monomer and an aromatic (meth)acrylate monomer to perform a second polymerization. The first polymerization may be carried out by swelling polymerization.

The vinyl-based monomer may be added such that the aromatic vinyl-based monomer is present in an amount of about 70 wt % to about 80 wt % and the vinyl cyanide monomer is present in an amount of about 20 wt % to about 30 wt %. Further, the monomer added in the first polymerization can be added to be present in an amount of about 20 wt % to about 50 wt %, for example about 30 wt % to about 40 wt %, based on the total weight of the monomer mixture.

Specifically, in the preparation method according to the invention, the vinyl-based monomer can be added in an amount of about 20 wt % to about 50 wt % in the first polymerization, and the vinyl-based monomer and the aromatic (meth)acrylate monomer can be added in an amount of about 50 wt % to about 80 wt % in the second polymerization, based on the total weight of the monomer mixture except for the rubber polymer. Further, the first polymerization may be carried out by adding a vinyl-based monomer, an initiator, a molecular weight regulator, an emulsifying agent and a reducing agent at once, heating to about 60° C. to about 65° C., and then adding a mixture of an oxidant and a ligand, thereby swelling the vinyl-based monomer into the rubber.

After the first polymerization, the resultant product can be left for about 20 minutes to about 50 minutes and heated to about 65° C. to about 75° C., and the remaining monomer mixture, the initiator and the molecular weight regulator can be slowly added dropwise to perform the second polymerization via graft polymerization. Among the monomer mixture added during second polymerization, the vinyl-based monomer is added such that the aromatic vinyl-based monomer is present in an amount of about 70 wt % to about 80 wt % and the vinyl cyanide monomer present in an amount of about 20 wt % to about 30 wt %. The phenyl and phenoxy group-containing (meth)acrylate monomer may be added in an amount of about 5 wt % to about 50 wt %, based on the total weight of the monomer mixture added during the first and second polymerization.

The rubber-modified graft copolymer sequentially polymerized as above may maximize the dispersibility of the rubber-modified graft copolymer in a resin substrate by efficiently grafting an aromatic (meth)acrylate to a rubber surface to improve compatibility with polycarbonate resin.

During the polymerization procedure, the rubber polymer may be added in an amount of about 40 wt % to about 70 wt % and the monomer mixture including the aromatic (meth)acrylate may be added in an amount of about 30 wt % to about 60 wt %. Within this range, the composition can have improved fluidity and appearance without suffering any reduction in impact resistance.

Thermoplastic Resin Composition

Another aspect of the present invention relates to a thermoplastic resin composition including the rubber-modified vinyl-based graft copolymer.

The thermoplastic resin is not particularly limited. Examples of the thermoplastic resin may include without limitation polystyrenes, polyphenylene ethers, polycarbonates, polyesters, polyamides, acrylate resins, and the like, and combinations thereof.

The rubber-modified vinyl-based graft copolymer can have excellent compatibility with polycarbonate, which may be advantageously mixed with the polycarbonate resin by maximizing dispersibility in a substrate.

In one embodiment, the thermoplastic resin composition may include a rubber-modified vinyl-based graft copolymer, which includes an aromatic (meth)acrylate monomer grafted to a surface thereof, and a polycarbonate resin.

The polycarbonate resin can have a weight average molecular weight (Mw) of about 10,000 g/mol to about 200,000 g/mol, for example about 15,000 g/mol to about 80,000 g/mol.

The thermoplastic resin composition may include about 70 wt % to about 99 wt % of the polycarbonate resin, for example about 80 wt % to about 95 wt % of the polycarbonate resin, and about 1 wt % to about 30 wt % of the rubber-modified vinyl-based graft copolymer, for example about 5 wt % to about 15 wt % of the rubber-modified vinyl-based graft copolymer, based on the total weight of the composition.

In some embodiments, the thermoplastic resin composition may include the polycarbonate resin in an amount of about 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of the polycarbonate resin can be in a range from about any of the foregoing amounts to about any other of the foregoing amounts.

In some embodiments, the thermoplastic resin composition may include the rubber-modified vinyl-based graft copolymer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the amount of the rubber-modified vinyl-based graft copolymer can be in a range from about any of the foregoing amounts to about any other of the foregoing amounts.

When the composition includes the polycarbonate resin and the rubber-modified vinyl-based graft copolymer in an amount within these ranges, the graft copolymer can exhibit high dispersibility with the polycarbonate resin, and the composition can have improved gloss, appearance and fluidity without deteriorating impact strength.

The thermoplastic resin composition of the present invention can have an impact strength of about 70 to about 80 kgf cm/cm (notched ⅛ inch) in accordance with ASTM D256, a melt flow index of about 18 to about 23 g/10 min (220° C., under a load of 10 kg) in accordance with ISO 1133, and a gloss (60°) of about 90 to about 100 GU in accordance with ASTM D523.

Optionally, the thermoplastic resin composition of the present invention may further include one or more additives depending on the use thereof. Examples of additives may include without limitation antioxidants, nucleating agents, surfactants, coupling agents, fillers, plasticizers, lubricating agents, antibacterial agents, release agents, heat stabilizers, light stabilizers, compatibilizers, inorganic additives, colorants, antistatic agents, pigments, dyes, flame-proofing agents, and the like, without being limited thereto. These may be used alone or in combination with one another.

The thermoplastic resin composition of the invention may be prepared into a resin molded article by any typical method known in the art. For example, the components of the invention and other additives can be simultaneously mixed, subjected to melt extrusion in an extruder to yield pellets and then the resulting pellets can be molded to form plastic injected articles or compression molded articles. There is no limitation as to a molding method, and for example, extrusion molding, injection molding, calendar molding, vacuum molding, and the like may be used.

The thermoplastic resin composition can have excellent appearance, fluidity and impact resistance, and may be employed in the preparation of housings for electric or electronic home appliances, such as televisions, washing machines, cassette players, MP3 players, DMB, navigation, cell phones, telephones, game consoles, stereo systems, monitors, computers, printers, photocopiers including automobile components, and exterior materials of automobiles.

Next, the present invention will be better appreciated from the following examples and comparative examples. It should be understood that these examples are provided for illustration only and are not to be construed in any way as limiting the scope of the present invention. Descriptions of details apparent to those skilled in the art will be omitted.

EXAMPLES

Preparative Example 1

To 50 parts by weight of a polybutadiene rubber is added 50 parts by weight of an acrylonitrile/styrene/2-hydroxy-3-phenoxypropyl acrylate mixture to perform graft polymerization via Redox catalyst polymerization.

2-hydroxy-3-phenoxy propyl acrylate is added in an amount of 5 parts by weight to the composition to be present in an amount of 10 wt % based on the total weight of the monomer mixture.

In graft polymerization, 35 parts by weight of the acrylonitrile/styrene mixture in 100 parts by weight of the monomer mixture except for the rubber is swollen into the rubber to perform first polymerization (AN/SM ratio=29/71). Subsequently, in 100 parts by weight of the monomer mixture except for the rubber, the remaining monomer mixture, namely 65 parts by weight of the acrylonitrile/styrene/2-hydroxy-3-phenoxypropyl acrylate mixture, is slowly added dropwise to a reactor to perform graft polymerization at an interface of the rubber.

The above polymerization is carried out in a 10 L glass reactor while stirring the components at 200 rpm.

In polymerization, 1.0 part by weight of a rosin acid-based emulsifying agent is used. As the polymerization initiator, 0.3 parts by weight of pyrolytic peroxide initiators such as cumyl hydroperoxide is used. The molecular weight regulator used in the polymerization is 0.3 parts by weight of tert-dodecyl mercaptan, and the like. The redox oxidation catalyst system used in polymerization initiation includes 0.003 parts by weight of an oxidizing agent, ferrous sulfate, 0.15 parts by weight of a ligand, 4-sodium pyrophosphate, and 0.3 parts by weight of a reducing agent, dextrose. After the polymerization, 0.5 parts by weight of an antioxidant is added, thereby ensuring thermal stability during drying of the latex.

The overall polymerization procedure is performed by emulsion polymerization, and the total amount of process water added for polymerization is 140 parts by weight based on 100 parts by weight of the monomers.

In first polymerization, to 50 parts by weight of rubber latex in a glass reactor, the monomer mixture, initiator, molecular weight regulator, emulsifying agent and reducing agent are charged at once, heated to 60° C., to which the mixture of the oxidizing agent and the ligand is charged to perform polymerization.

In a second polymerization, 30 minutes after the first polymerization, the reactor is heated to 70° C., and then the remaining monomer mixture and the mixture of the initiator and the molecular weight regulator are slowly added dropwise for 120 minutes to perform polymerization.

Around the completion of the second polymerization, the reactor is maintained at 70° C. for 30 minutes for polymerization the remaining monomers, thereby ensuring that the amount of final remaining monomers is not more than 2.0 parts by weight.

The polymerized latex is slowly added dropwise to a 1.0% solution of sulfuric acid at 70° C. to destroy latex and form slurry particles. The resulting particles are dried through a fluidized bed dryer for 60 minutes to yield g-ABS powder having a moisture regain of 1.0 part by weight or less, and a remaining monomer of 5000 ppm or less.

Preparative Example 2

A graft copolymer is prepared through polymerization in the same manner as in Preparative Example 1 except that 10 parts by weight of 2-hydroxy-3-phenoxy propyl acrylate is added.

Preparative Example 3

A graft copolymer is prepared through polymerization in the same manner as in Preparative Example 1 except that phenoxy ethyl acrylate is used instead of 2-hydroxy-3-phenoxy propyl acrylate.

Preparative Example 4

A graft copolymer is prepared through polymerization in the same manner as in Preparative Example 3 except that 10 parts by weight of phenoxy ethyl acrylate is added.

Preparative Example 5

A graft copolymer is prepared through polymerization in the same manner as in Preparative Example 1 except that phenyl methacrylate is used instead of 2-hydroxy-3-phenoxy propyl acrylate.

Preparative Example 6

A graft copolymer is prepared through polymerization in the same manner as in Preparative Example 5 except that 10 parts by weight of phenyl methacrylate is used.

Preparative Example 7

A graft copolymer is prepared through polymerization in the same manner as in Preparative Example 1 except that 2-hydroxy-3-phenoxy propyl acrylate is not added and 50 parts by weight of a vinyl-based monomer is used.

TABLE 1

|  |  | Preparative Example 1 | Preparative Example 2 | Preparative Example 3 | Preparative Example 4 | Preparative Example 5 | Preparative Example 6 | Preparative Example 7 |
|---|---|---|---|---|---|---|---|---|
| Polybutadiene rubber |  | 50 | 50 | 50 | 50 | 50 | 50 | 50 |
| Vinyl-based monomer (AN/SM ratio) |  | 45 (29/71) | 40 (29/71) | 45 (29/71) | 40 (29/71) | 45 (29/71) | 40 (29/71) | 50 (29/71) |
| Aromatic (meth) acrylate | Sort | 2-Hydroxy-3-phenoxy propyl acrylate | | Phenoxy ethyl acrylate | | Phenyl methacrylate | | — |
| Aromatic (meth) acrylate | Amount | 5 | 10 | 5 | 10 | 5 | 10 | 0 |

Examples 1 to 6 and Comparative Example 1

5 parts by weight of the graft copolymer prepared in Preparative Examples 1 to 7 is mixed with 95 parts by weight of polycarbonate having a molecular weight of 25,000 g/mol, which is extruded using a 450 extruder at 240° C. to prepare resin specimens.

Comparative Example 2

A specimen is prepared in the same manner as in Example 1 except that g-ABS(CHT) manufactured by Cheil Industries Inc. is used as a graft copolymer. The g-ABS(CHT) has a rubber content of 58%, a rubber particle size of 300 nm, and an AN/SM content of 42% (AN/SM ratio=25%/75%).

Comparative Example 3

A specimen is prepared in the same manner as in Example 1 except that g-ABS(CHA) manufactured by Cheil Industries Inc. is used as a graft copolymer. The g-ABS(CHA) has a rubber content of 48%, a rubber particle size of 130 nm, and an AN/SM content of 52% (AN/SM ratio=29%/71%).

Comparative Example 4

A specimen is prepared in the same manner as in Example 1 except that SAN (AP-30) manufactured by Cheil Industries Inc. is used as a graft copolymer. The SAN (AP-30) has 28.5 wt % of AN and 71.5 wt % of SM.

Appearance, impact resistance and fluidity of the specimens are measured by the following methods and results are shown in Table 2.

(1) Impact strength: IZOD impact strength is measured in accordance with ASTM D256 (specimen thickness: 1/8").
(2) Melt flow index (MI): Melt flow index (g/10 min) is measured at 220° C. and under a load of 10 kg in accordance with ISO 1133.
(3) Appearance: The degree of gas mark and flow mark on a surface of the resin is measured. Gloss (60° gloss) is measured using a Gardner Gloss Meter in accordance with ASTM D523.

TABLE 2

|  |  | Example | | | | | | Comparative Example | | | |
|---|---|---|---|---|---|---|---|---|---|---|---|
|  |  | 1 | 2 | 3 | 4 | 5 | 6 | 1 | 2 | 3 | 4 |
| PC (parts by weight) |  | 95 | 95 | 95 | 95 | 95 | 95 | 95 | 95 | 95 | 95 |
| g-ABS or SAN | Preparative Example 1 | 5 | — | — | — | — | — | — | — | — | — |
|  | Preparative Example 2 | — | 5 | — | — | — | — | — | — | — | — |
|  | Preparative Example 3 | — | — | 5 | — | — | — | — | — | — | — |
|  | Preparative Example 4 | — | — | — | 5 | — | — | — | — | — | — |
|  | Preparative Example 5 | — | — | — | — | 5 | — | — | — | — | — |
|  | Preparative Example 6 | — | — | — | — | — | 5 | — | — | — | — |
|  | Preparative Example 7 | — | — | — | — | — | — | 5 | — | — | — |
|  | g-ABS (CHT) | — | — | — | — | — | — | — | 5 | — | — |
|  | g-ABS (CHA) | — | — | — | — | — | — | — | — | 5 | — |
|  | SAN | — | — | — | — | — | — | — | — | — | 5 |
| Impact strength (1/8") (kgf · cm/cm) |  | 76 | 74 | 77 | 75 | 74 | 71 | 70 | 67 | 51 | 15 |
| Melt flow index (MI) (g/10 min) |  | 20.3 | 22.5 | 20.5 | 22.3 | 18.5 | 18.9 | 17.6 | 16.5 | 16.9 | 25.9 |
| Appearance | Gas mark | ⊚ | ⊚ | ○ | ○ | ○ | ○ | Δ | ○ | Δ | Δ |
|  | Flow mark | ○ | ⊚ | ○ | ⊚ | ○ | ○ | Δ | Δ | ○ | Δ |
|  | Gloss (GU) | 95 | 98 | 92 | 95 | 96 | 98 | 87 | 87 | 89 | 98 |

* Appearance, ⊚: Excellent, o: Good, Δ: Reduction

As shown in Table 2, in Examples 1 to 6, in which the aromatic (meth)acrylic monomer is added to an ABS interface upon polymerization of g-ABS, the specimens exhibit better impact strength and fluidity than those of Comparative Examples 1 to 4. Specifically, the specimens prepared in Examples 1 to 6 exhibit high gloss and little gas mark or flow mark on the surface of the resin, thereby ensuring remarkably excellent appearance.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A thermoplastic resin composition comprising:
   about 1 wt % to about 30 wt % of a rubber-modified vinyl-based graft copolymer and about 70 wt % to about 99 wt % of a polycarbonate resin,
   wherein the rubber-modified vinyl-based graft copolymer comprises:
   a core formed of a rubber polymer selected from the group consisting of butadiene rubber, ethylene/propylene rubber, styrene/butadiene rubber, acrylonitrile/butadiene rubber, isoprene rubber, ethylene-propylene-diene terpolymer (EPDM), polyorganosiloxane/polyalkyl methacrylate rubber complex, and mixtures thereof; and
   a shell grafted to the core, wherein the shell includes an aromatic (meth)acrylate comprising a hydroxyl group.

2. The thermoplastic resin composition according to claim 1, wherein the aromatic (meth)acrylate comprising a hydroxyl group is represented by Formula 1:

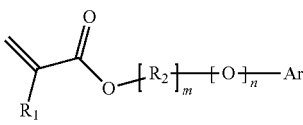

[Formula 1]

wherein $R_1$ is hydrogen or methyl, $R_2$ is substituted or unsubstituted $C_1$ to $C_{10}$ alkylene, Ar is phenyl substituted with a hydroxyl group, m is 0 or 1, and n is 0 or 1.

3. The thermoplastic resin composition according to claim 2, wherein the aromatic (meth)acrylate is 2-hydroxy-3-phenoxy propyl acrylate, 2-hydroxy-3-phenoxy propyl methacrylate, or a mixture thereof.

4. The thermoplastic resin composition according to claim 1, wherein the rubber-modified vinyl-based graft copolymer comprises: about 30 wt % to about 60 wt % of a monomer mixture comprising the aromatic (meth)acrylate and about 40 wt % to about 70 wt % of a rubber polymer.

5. The thermoplastic resin composition according to claim 4, wherein the monomer mixture comprises about 50 wt % to about 95 wt % of a vinyl-based monomer and about 5 wt % to about 50 wt % of the aromatic (meth)acrylate.

6. The thermoplastic resin composition according to claim 5, wherein the vinyl-based monomer comprises about 70 wt % to about 80 wt % of an aromatic vinyl-based monomer and about 20 wt % to about 30 wt % of a vinyl cyanide monomer.

7. The thermoplastic resin composition according to claim 1, having an impact strength of about 70 kgf·cm/cm to about 80 kgf·cm/cm (notched ⅛ inch) in accordance with ASTM D256, a melt flow index of about 18 g/10 min to about 23 g/10 min (220° C., under a load of 10 kg) in accordance with ISO 1133, and a gloss (60°) of about 90 GU to about 100 GU in accordance with ASTM D523.

8. The thermoplastic resin composition according to claim 1, further comprising: at least one additive selected from the group consisting of antioxidants, nucleating agents, surfactants, coupling agents, fillers, plasticizers, lubricating agents, antibacterial agents, release agents, heat stabilizers, light stabilizers, compatibilizers, inorganic additives, colorants, antistatic agents, pigments, dyes, flame-proofing agents, and combinations thereof.

9. The thermoplastic resin composition according to claim 1, wherein the shell comprises an aromatic vinyl-based monomer, a vinyl cyanide monomer, and the aromatic (meth)acrylate.

10. The thermoplastic resin composition according to claim 9, wherein the rubber polymer is butadiene rubber.

* * * * *